April 10, 1928.
C. J. RODMAN
1,665,933
GLISSOMETER
Filed Dec. 21, 1923
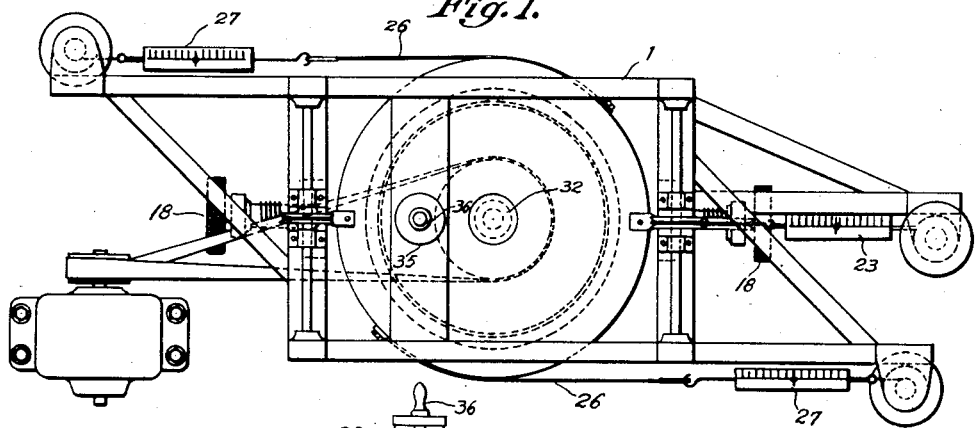
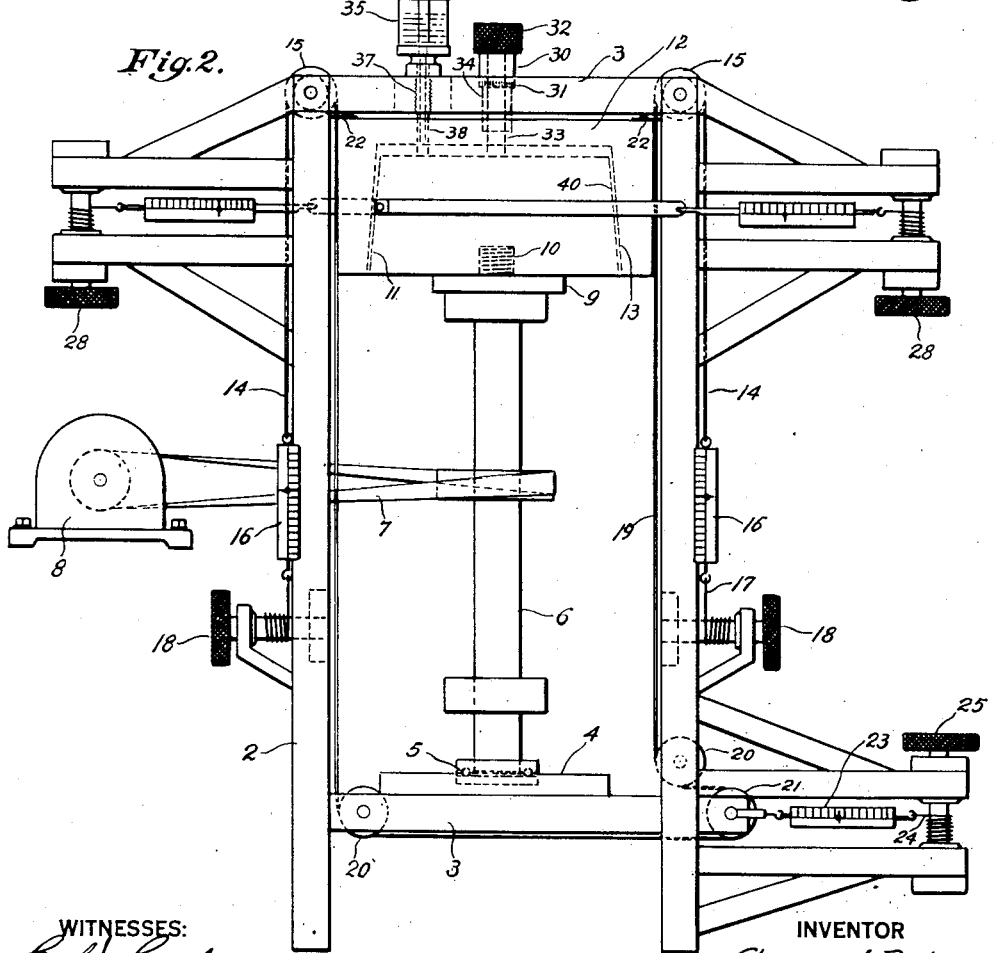
WITNESSES:
INVENTOR
Clarence J. Rodman
BY
ATTORNEY Patented Apr. 10, 1928.

1,665,933

UNITED STATES PATENT OFFICE.

CLARENCE J. RODMAN, OF WILKINSBURG, PENNSYLVANIA, ASSIGNOR TO WESTINGHOUSE ELECTRIC & MANUFACTURING COMPANY, A CORPORATION OF PENNSYLVANIA.

GLISSOMETER.

Application filed December 21, 1923. Serial No. 682,073.

My invention relates to measuring devices and more especially to a device for determining the lubricating qualities and general characteristics of viscous lubricating substances.

It is among the objects of my invention to provide an indicating device for determining the general qualities and characteristics of lubricants which shall be of simple and inexpensive construction, which shall facilitate the testing of lubricants on a practical basis and which shall be relatively inexpensive to adapt it for use in railway shops and places where testing facilities are ordinarily not available.

It is a further object of my invention to provide a testing device which shall be adapted to determine the unctuousness, pressure and heat-resisting qualities of lubricants, such as oils and greases, in a simple and expedient manner.

Lubricants are generally classified for the various uses to which they are put in accordance with their general characteristics and the circumstances and general operating conditions incidental to their service requirements. Besides the general characteristics of lubricants, such as oxidation and deterioration when subjected to heat and atmospheric changes, it is essential to know all of their physical properties to determine whether they will adequately meet the service conditions.

My present invention provides a glissometer which is capable of indicating these qualities so that lubricants may be applied with knowledge of their characteristics and greater certainty of their serviceability and performance.

In the accompanying drawing constituting a part hereof and in which like reference characters designate like parts, Fig. 1 is a top plan view of a testing device embodying the principles of my invention, and Fig. 2 is a side elevational view thereof.

The testing device comprises a frame 1, having vertical pedestals 2 and cross members 3, the lower portion of which is provided with a base plate 4 carrying a ball bearing 5 which constitutes a thrust bearing for a vertical spindle 6 which is supported at its upper end portion in the manner shown.

The spindle 6 is rotated in any suitable manner, as by a belt connection 7 to a driving motor 8, which may be supported on the frame structure 1 or independently thereof. The upper end of the spindle 6 is provided with a shoulder 9 and a screw-threaded end 10 which are adapted to respectively seat and secure a conical head 11.

A pressure block 12, having a tapered opening 13 in co-operating alinement with the head 11 of the spindle, is suspended from the frame by means of guy wires 14 disposed around a plurality of sheave wheels or pulleys 15. The free ends of the wires are attached to a pair of spring balances 16 having flexible ends 17 which are wound around adjusting screws 18. A wire 19 is disposed around a plurality of guide pulleys 20 and an adjusting pulley 21 and is secured at its respective ends to the pressure block 12 by clips 22. The adjusting pulley 21 is secured to a spring balance 23 which has a flexible connection 24 with an adjusting screw 25.

A pair of strips 26 are secured at one end to the pressure block 12 and extend tangentially therefrom. Their free ends are secured to spring balances 27 which are secured to adjusting screws 28. A space indicator 30 comprising a graduated sleeve 31 having a knurled head 32 and a plunger 33 in screw-threaded engagement with a graduated barrel 34 is secured to the upper portion of the frame 1, extending through an opening in the pressure block 12 to adapt the plunger 33 to engage the top surface of the conical head 11 of the spindle 6. A suitable container for a lubricant, such as an oil-cup 35 having a regulator 36, is mounted on the frame 1 and is provided with a feed pipe 37 extending through an opening 38 in the pressure block 12 to establish communication with the top surface of the head 11.

The operation of this device is briefly as follows: The oil-cup 35 is filled with the lubricant to be tested and the flow is regulated by the adjusting valve 36 to provide a predetermined flow of oil on the head 11 of the spindle. The spindle 6 is actuated by the driving motor 8 causing the head to rotate at a suitable speed and the adjusting screws 18, 25 and 28 are regulated to provide an initial tension on the guy wires and bands to take up all of the slack. Pressure is then exerted on the lubricant by adjusting the screw 25 to apply tension on the guy wire 19 which pulls the block 12 towards the head 11, thus decreasing the space 40 between the tapered portion of the head and block. The amount this space is reduced may be determined by adjusting the micrometer indicator 30 so that the plunger 33 engages the top of the head 11. The variation from zero position of the graduations will indicate the relative movement of the block 12 and head 11 which is a measure of the thickness of the oil film and the amount of pressure applied is determined by reading the spring balances 16 and 23.

The algebraic sum of the vertical forces exerted by the spring balances plus the weight of the block 12, represents the total force exerted downwardly upon the oil film. The normal component of this force may then be computed and divided by the total area of the oil film to determine the effective pressure per unit area that is exerted upon the film.

The unctuousness of the lubricant is determined by the tendency of the block 12 to rotate, which is registered on the spring balances 27. Temperature conditions may be determined by a thermo-couple or thermometers placed in convenient positions in small wells on the pressure block 12.

It is evident that by means of a device such as I have described, uniform tests may be made to determine the quality of the lubricant in a variety of ways, particularly to determine the strength of the lubricating film under pressure, the thickness of the film for a given pressure and the viscosity or unctuousness of the material in an efficient and expedient manner.

Although I have described a specific embodiment of my invention, it will be obvious to those skilled in the art that various modifications may be made in the details of construction without departing from the principles herein set forth.

I claim as my invention:

1. A glissometer comprising a plurality of relatively movable interfitting members, means for applying lubricant between the adjacent surfaces of said members, means coacting with one of said members for subjecting said lubricant to pressure, and means for indicating the unctuousness and thickness of the lubricant film.

2. A glissometer comprising a plurality of relatively movable interfitting members, means for applying lubricant between the adjacent surfaces of said members, means coacting with one of said members for subjecting said lubricant to pressure, means for indicating the relative movement of said members, and means for indicating the thickness of the lubricant film.

3. A glissometer comprising a plurality of relatively movable interfitting members, means for applying lubricant between the adjacent surfaces of said members, means coacting with one of said members for subjecting said lubricant to pressure, means for indicating the relative movement of said members, means for indicating the pressure on the lubricant, and means for measuring the thickness of the lubricant film.

4. A glissometer comprising a frame structure, a rotatable member supported therein, means for applying a film of lubricant to said rotatable member, means for subjecting the lubricant to pressure, and means for determining the thickness of the lubricating film.

5. In a device for testing the quality of a lubricant, the combination with a plurality of relatively movable interfitting members, of means for applying lubricant between the adjacent surfaces of said members, means coacting with one of said members for subjecting the lubricant to pressure, means for indicating the pressure exerted on the lubricant, means for measuring the thickness of the film of lubricant and means for measuring the torque transmitted from one interfitting member to another.

6. In a device for testing the quality of a lubricant, a frame member, a spindle journalled for rotation therein, a bearing head on the spindle, a pressure block for cooperating with the bearing head, means for introducing a lubricant to be tested between the pressure block and the bearing head to establish a lubricating film, means for rotating said spindle and bearing head, means for indicating the torque transmitted to the pressure block and means for measuring the thickness of the film of lubricant.

In testimony whereof, I have hereunto subscribed my name this 17th day of December, 1923.

CLARENCE J. RODMAN.